(12) United States Patent
Hegar et al.

(10) Patent No.: US 11,601,533 B1
(45) Date of Patent: Mar. 7, 2023

(54) SOURCE PORT ADAPTIVE MULTI-PATH (SAM) PROTOCOL

(71) Applicant: Amazon Technologies, Inc., Seattle, WA (US)

(72) Inventors: Ryan Hegar, Happy Valley, OR (US); Norman Bright, Portland, OR (US); Kevin Moore, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 117 days.

(21) Appl. No.: 17/034,901

(22) Filed: Sep. 28, 2020

(51) Int. Cl.
*H04L 69/00* (2022.01)
*H04L 69/324* (2022.01)
*H04L 43/0864* (2022.01)
*H04L 1/00* (2006.01)
*H04L 69/16* (2022.01)

(52) U.S. Cl.
CPC ............ *H04L 69/26* (2013.01); *H04L 1/0041* (2013.01); *H04L 43/0864* (2013.01); *H04L 69/16* (2013.01); *H04L 69/324* (2013.01)

(58) Field of Classification Search
CPC ... H04L 69/26; H04L 1/0041; H04L 43/0864; H04L 69/16; H04L 69/324
See application file for complete search history.

(56) References Cited

U.S. PATENT DOCUMENTS

| 10,038,741 | B1 * | 7/2018 | Judge | H04L 67/10 |
| 2019/0149398 | A1 * | 5/2019 | Shaw | H04L 49/50 |
| | | | | 370/244 |
| 2020/0067629 | A1 * | 2/2020 | Xiong | H04N 21/6473 |
| 2021/0409335 | A1 * | 12/2021 | Zhu | H04L 47/24 |

FOREIGN PATENT DOCUMENTS

EP          3944593 A1 *  1/2022  ........... H04L 67/141

* cited by examiner

*Primary Examiner* — Jackie Zuniga Abad
(74) *Attorney, Agent, or Firm* — Nicholson De Vos Webster & Elliott LLP

(57) ABSTRACT

Techniques for adapting source ports for traffic include generating a first packet with a header and a payload, the header including an indication of a first source port from which the first packet is to be transmitted. The first packet is transmitted to a receiver using the first source port and, upon not receiving an acknowledgment from the receiver, a second packet with second header and the same payload is generated. The second header includes an indication of a second, different source port from which the second packet is to be transmitted. The second packet is transmitted to the receiver using the second, different source port. An acknowledgment is received from the receiver for one of the first or second packets, and the acknowledgment includes an indication of the source port that sent the packet.

20 Claims, 11 Drawing Sheets

SOURCE PORT ADAPTIVE MULTI-PATH (SAM) PROTOCOL

BACKGROUND

Traditional on-premise video infrastructure is dedicated to video delivery. By keeping other traffic off of the video network, ensuring path diversity for redundant flows, and by tightly controlling switch upgrade windows, on-premise operators can achieve very reliable delivery of IP based video content. When running video workflows on top of a cloud network, users demand that same high reliability despite the network carrying hybrid traffic for numerous applications, delivering traffic over a mix of protocols, and the network being subject to asynchronous software updates and node replacements.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for a Source port Adaptive Multi-path (SAM) protocol. One of the advantages of a cloud network relative to on-premises networks is its scale and the amount of path diversity available between servers, etc. in the same data center(s) and region. Path diversity provides an opportunity to route around unreliable or congested links. The SAM protocol uses network path diversity to pro-actively re-route flows that experience packet loss. SAM is a connectionless transport layer protocol that rides on top of the user datagram protocol (UDP). It provides best-effort, non-duplicated delivery of packets with order guarantees. As live video applications degrade with increased latency and therefore packet delivery time is bounded by the protocol and successful packet delivery is not guaranteed, the use of SAM provides retransmission of lost/delayed packets over multiple/varying network paths to reduce unrecoverable packet loss relative to alternatives.

A SAM sender encapsulates each packet of client data with a SAM header and transmits the packet via UDP to the destination on one flow, where in this context a flow is exemplarily defined as a UDP stream consisting of a 5-tuple of protocol, source IP, source port, destination IP, destination port. If the sender does not receive a positive acknowledgment (ACK) via an ACK packet from the receiver within a retry interval (e.g., 10 milli-seconds) then the packet is resent (albeit with a slightly modified header) at least twice. If none of the subsequent (replacement) packets are acknowledged within another retry interval (e.g., the same amount of time as the previous retry interval, or in some embodiments, a greater amount of time) then the packet is retried two more times, and so on, until a packet has either been acknowledged or has been sent the maximum number of times.

Each time a packet is not acknowledged within the retry interval, at least one new source port on the sender is chosen for the subsequent packet sends (in some embodiments, the source port is the same for each subsequent packet send turn, and in other embodiments, the multiple, previously unused source ports are used to send the subsequent packets separately). Changing the source port(s) changes the routing of subsequent packets within the provider network allowing subsequent packets to route around problems. The retry interval may be tuned relative to a round-trip time and the maximum number of retries may be tuned for a particular application (e.g., live video applications to balance the desire for low latency video with reliable delivery).

Figure 1:
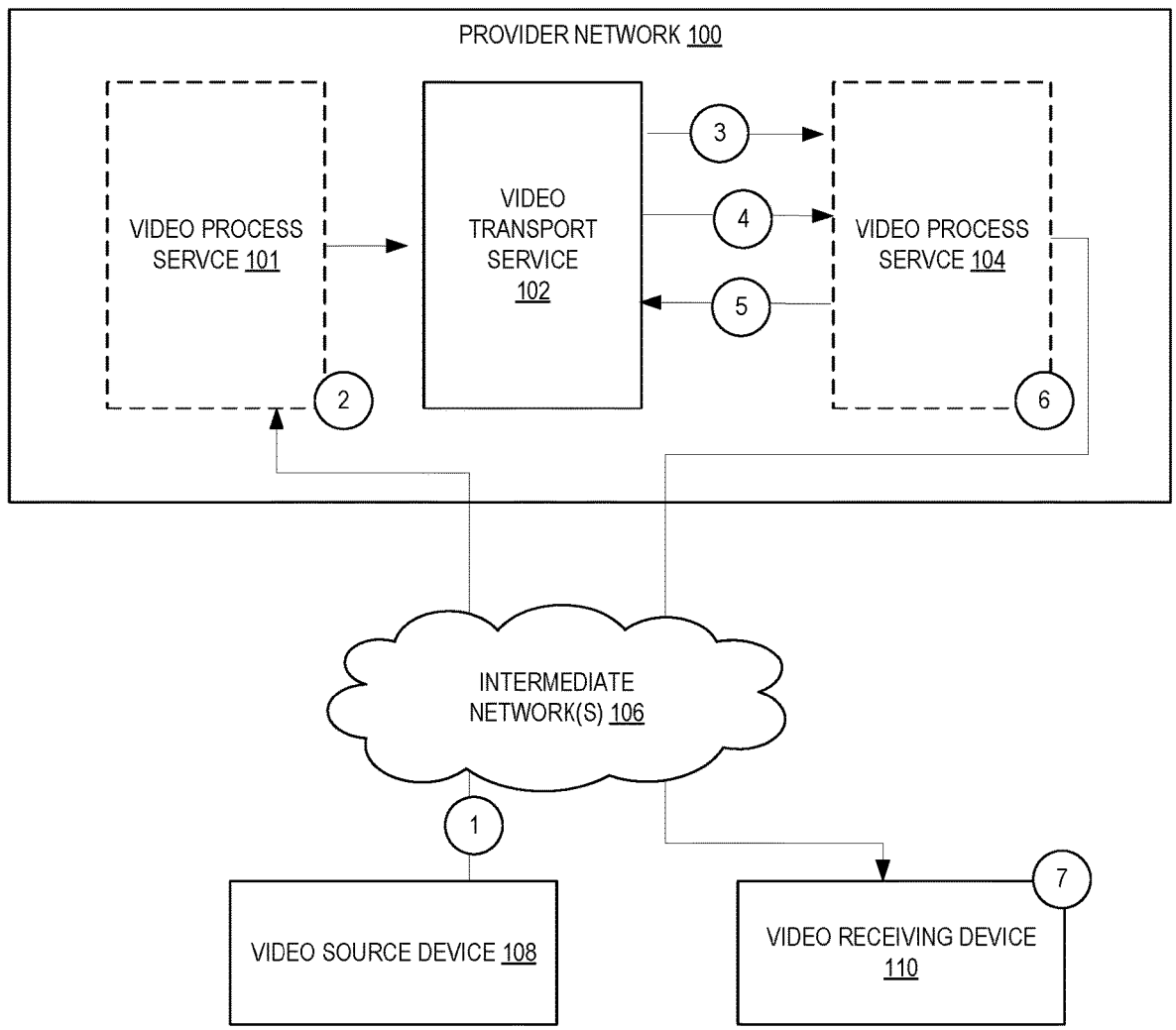
FIG. 1 illustrates embodiments of an exemplary usage of SAM.

FIG. 1 illustrates embodiments of an exemplary usage of SAM. As shown, a provider network 100 includes a plurality of video services (note the types of services are exemplary and not meant to connote that SAM only works with these types of services as SAM is more broadly applicable especially in a UDP context). A video process service instance 101 encodes video delivered from a video source device 108 (such as a camera, etc.). The video process service instance 101 compresses video sources into multiple versions for distribution. Note this service may be deployed on-prem.

A video transport service instance 102 ingests content from the video service to encode video 101 and sends the content to specified outputs, such as a cloud encoder, another video transport service instance 102 or an on-premises destination. This service can perform the encoding, packaging, delivering, or receiving of video content.

A video process service instance 104 receives the content and creates live outputs video delivery to a video receiving device 110. In some embodiments, the video process service instance 104 and the video process service instance 101 are the same service.

The interactions delivering content from the various instances in the provider network 100 utilize SAM to deliver the content. In particular, the video transport service instance 102 utilizes SAM to transmit video the video process service instance 104.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

A cloud provider network can include a physical network (e.g., sheet metal boxes, cables) referred to as the substrate. The cloud provider network can also include an overlay network of virtualized computing resources that run on the substrate. As such, network packets can be routed along a substrate network according to constructs in the overlay network (e.g., virtual private networks, virtual firewalls, and the like). A mapping service can coordinate the routing of these network packets. The mapping service can be a regional distributed look up service that maps the combination of overlay Internet Protocol (IP) address and network identifier to a substrate IP address so that the distributed substrate computing devices can look up where to send packets.

To illustrate, each physical host can have an IP address in the substrate network. Hardware virtualization technology can enable multiple operating systems to run concurrently on a host computer, for example as VMs on the host. A hypervisor, or virtual machine monitor (VMM), on a host allocates the host's hardware resources amongst various VMs on the host and monitors the execution of the VMs. Each VM may be provided with one or more IP addresses in the overlay network, and the VMM on a host may be aware of the IP addresses of the virtual machines on the host. The VMMs (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (e.g., public IP addresses) to substrate IP addresses (e.g., private IP addresses), which can be accessed by various processes on the cloud provider network for routing packets between endpoints.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

Circles with numbers in them indicate an exemplary flow of actions. At circle 1, the video source device 108 captures video and sends that to the video process service instance 101. The video process service 101 encodes the video at circle 2 and provides the encoded video to the video transport service 102.

The video transport service 102 generates a SAM packet (including one or more video payloads) and sends the SAM packet over UDP to the video process service 104 at circle 3. This first SAM packet is sent from a first port. There is no reply from the video process service 104 and the video transport service 102 sends the packet again (twice) to the video process service 104 at circle 4. This second (and third) attempt is sent from a different source port (and the header of the SAM packet updated accordingly).

At circle 5, the video process service 104 acknowledges the receipt of one of the sent packets (first, second, or third) and includes an indication of from which source port the SAM packet originated. At circle 6, the video process service 104 processes the payload and sends video content to the video receiving device 110 at circle 7.

Figure 2:
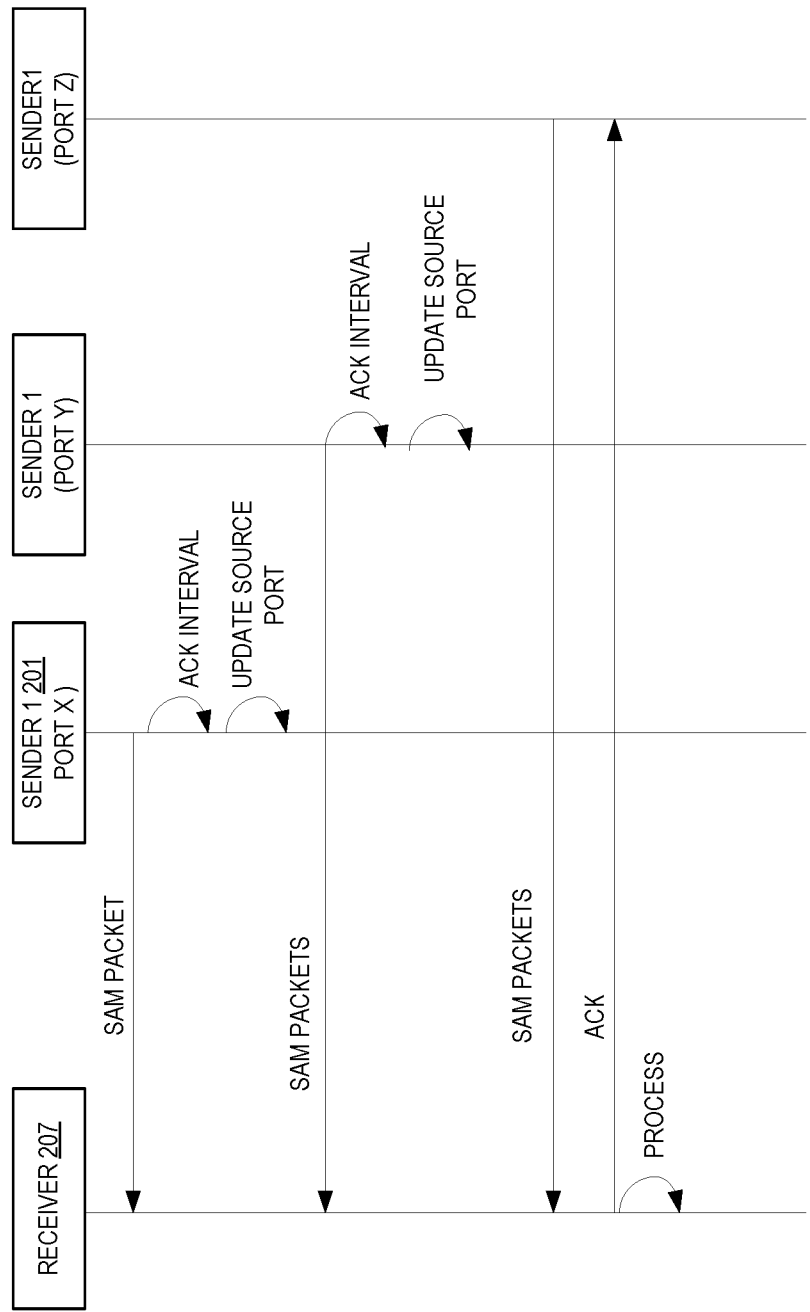
FIG. 2 illustrates an exemplary "swimlane" diagram showing an exemplary use of SAM according to some embodiments.

FIG. 2 illustrates an exemplary "swimlane" diagram showing an exemplary use of SAM according to some embodiments. In particular, a sender 201 is shown using multiple ports to attempt to communicate with a receiver 207.

As shown, the sender 201 sends a first SAM packet to the receiver 207 using port X. An acknowledgement (or retry) interval passes and the sender 201 updates the source port(s) to use and retries sending the SAM packet at least two times (although with a modified header to indicate the change in source port(s)).

A second acknowledgement (or retry) interval passes and the sender 201 again updates the source port(s) to use and retries sending the SAM packet at least two times (although with a modified header to indicate the change in source port(s)).

After this third attempt, the receiver 207 responds with an acknowledgment. In some embodiments, acknowledgements are batched and not sent after an individual SAM packet is received. Having the payload, the receiver 207 then processes it.

Figure 3:
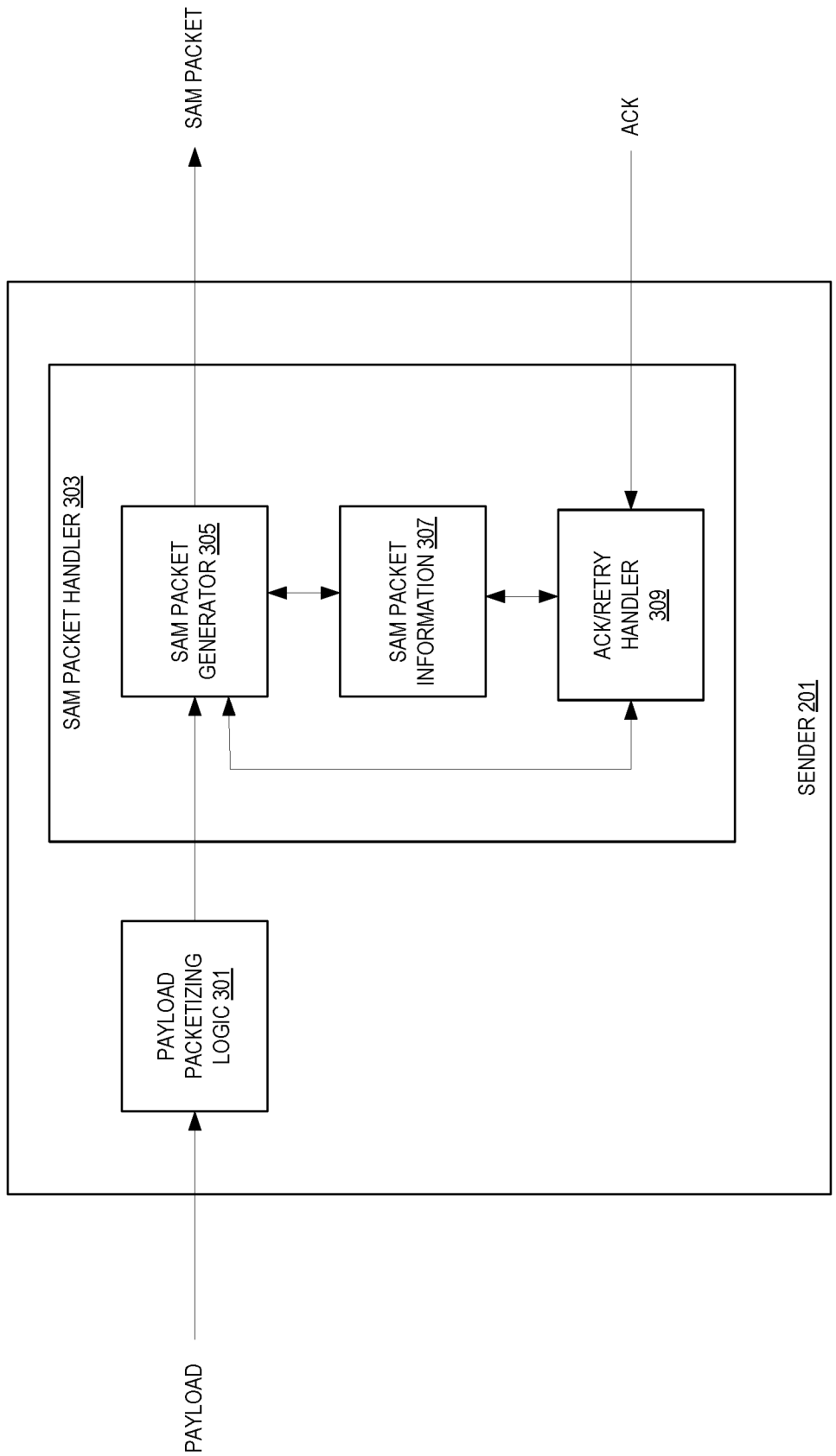
FIG. 3 illustrates an exemplary sender using SAM according to some embodiments.

FIG. 3 illustrates an exemplary sender using SAM according to some embodiments. Note that this sender 201 may be a part of an instance as shown in FIG. 1. As shown, a payload is received by the sender 201 to be packetized by the packetizing logic 301. The payload is not dictated. For example, the payload could contain MPEG2 transport stream packets either with or without further encapsulation. Depending on the network, etc., how the payload is chunked may be different. For example, most video streaming video applications use payload sizes that ensure each payload fits in an Ethernet frame MTU without requiring fragmentation. Limiting the size of payloads can help reduce latency and improve clock recovery. In some embodiments, the SAM payload size is to be restricted to 1500 bytes minus the protocol overhead required by SAM. Note that a SAM packet may have more than one payload.

Once a payload is ready for a packet, a SAM packet handler 303 generates a SAM data packet to send (details of the contents of exemplary embodiments of a SAM packet are detailed later). A SAM packet generator 305 generates a header and appends the payload to the header to form a SAM packet. The SAM packet generator 305 also maintains some SAM packet information 307 (sequence numbers).

An ack/retry handler 309 receives acknowledgments from receivers and uses those acknowledgments (and information from the SAM packet generator 305) to track what source ports have been used and which ones the receiver(s) have not received SAM data packets from. The ack/retry handler 309 also tracks retry intervals and alerts the SAM packet generator 305 of when to retry.

Figure 4:
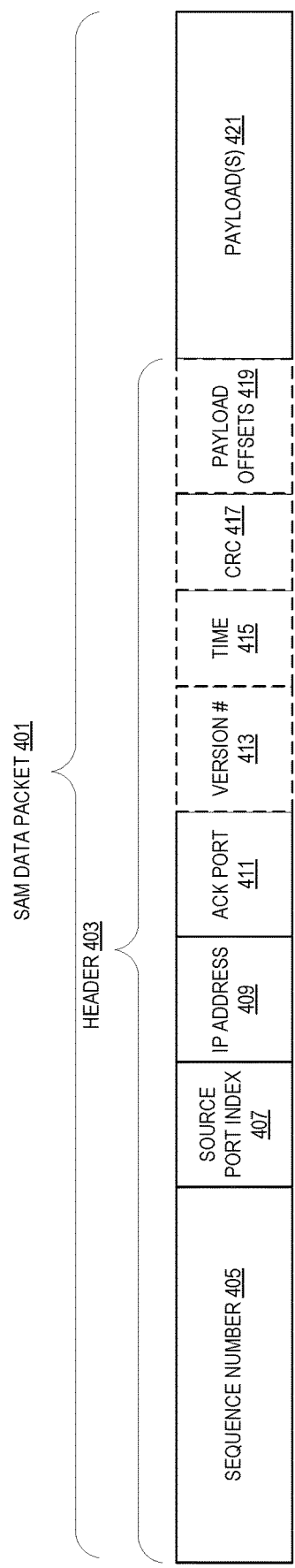
FIG. 4 illustrates an exemplary SAM data packet format according to some embodiments.

FIG. 4 illustrates an exemplary SAM data packet format according to some embodiments. The SAM data packet 401 includes a header 403 and one or more payloads 421. The header 403 includes a sequence number 405 that is incremented for each payload (or group of payloads) transmitted and which enables packet re-ordering at the destination. In some embodiments, the sequence number 405 is a 48-bit value.

The SAM header 403 includes a source port index (SPI) 407. The SPI 407 is a zero-based index that the sender uses to map back to the source port that was used to send a particular packet. Using an index reduces the size of ACK packets relative to the alternative of indicating source ports directly. However, in some embodiments, a source port is indicated directly.

The SAM header 403 includes the IP address 409 of the sender which initiated the transfer and a port number 411 which the sender is listening for ACKs on. This information allows the destination/receiver to reply to the sender with ACKs.

In some embodiments, the header 403 includes a version number 413 which indicates a version of the SAM packet header.

In some embodiments, the header 403 includes a time value 415 that indicates to a receiver how long it should wait to consider a subsequent packet to be received. Essentially, this is a late packet threshold.

In some embodiments, the header 403 or payload 421 includes a cyclic redundancy check (CRC) or other error detecting code 417. This error correcting code can be used by the receiver to try to ensure that the payload that is received is not corrupted.

In some embodiments, the SAM data packet 401 includes multiple payloads 421 and a field of the header is used for payload offsets 419.

Figure 5:
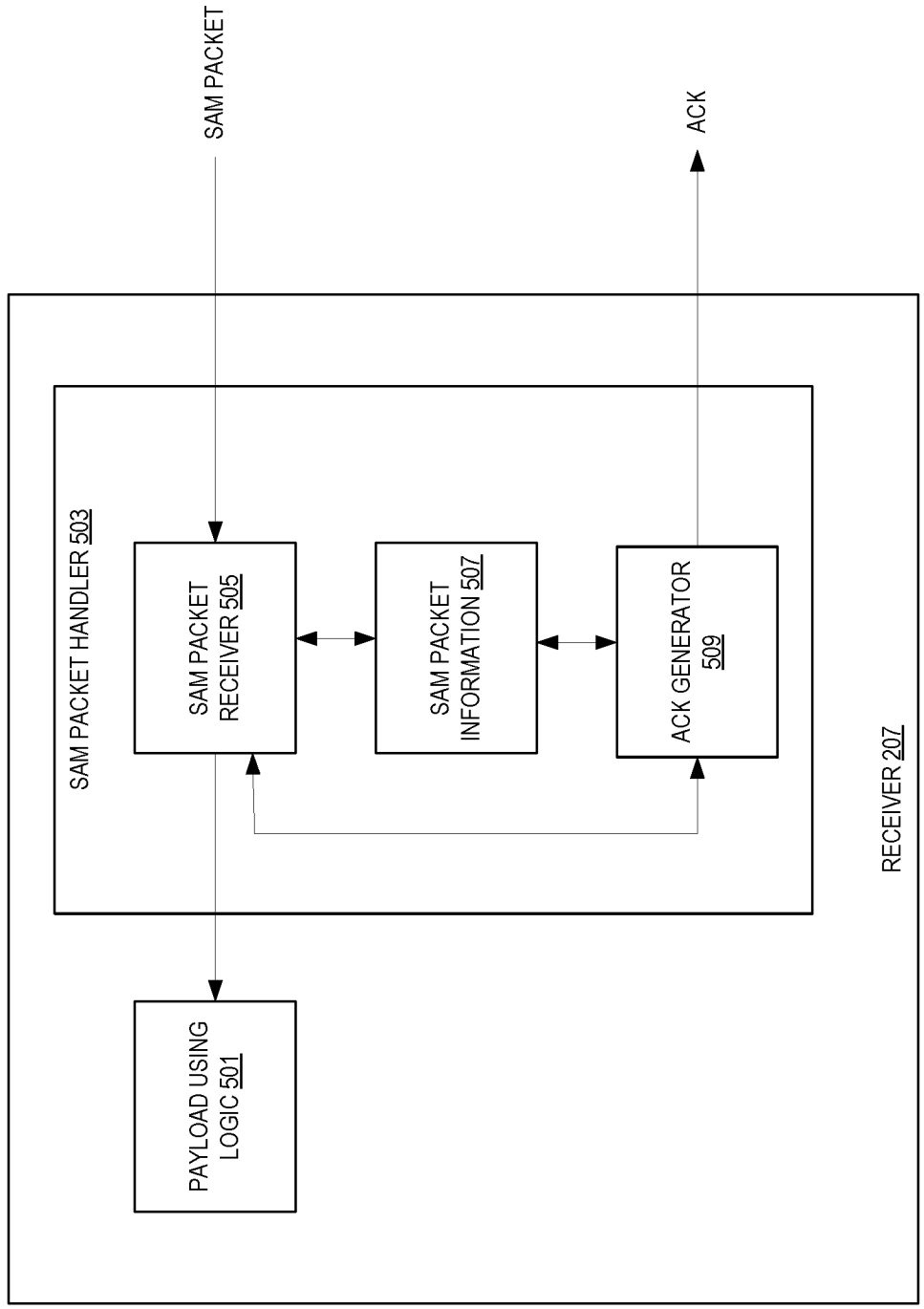
FIG. 5 illustrates an exemplary receiver using SAM according to some embodiments.

FIG. 5 illustrates an exemplary receiver using SAM according to some embodiments. Note that this receiver 207 may be a part of an instance as shown in FIG. 1. As shown, a SAM packet is received by the receiver 207 to be handled by the SAM packet receiving logic 505. The SAM packet receiving logic 505 adds information about the packet (the SPI, sequence number, etc.) into the SAM packet information 507. It also alerts the ACK generator 509 to generate an ACK as detailed herein.

The payload(s) extracted by the SAM packet receiver 505 is processed by payload using logic 501.

Figure 6:
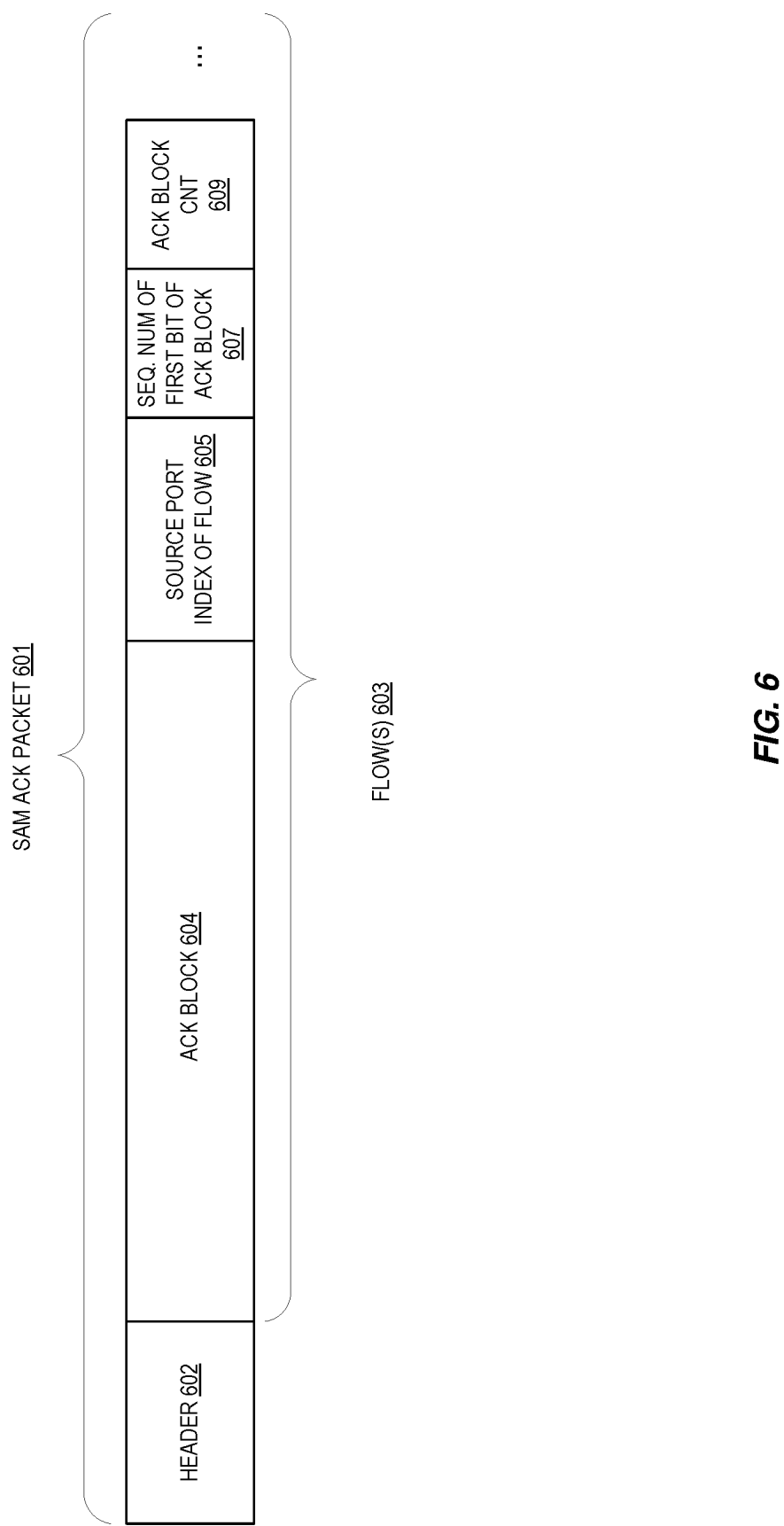
FIG. 6 illustrates an exemplary SAM acknowledge packet format according to some embodiments.

FIG. 6 illustrates an exemplary SAM acknowledge packet format according to some embodiments. The receiver sends an ACK to the sender that indicates which sequence number was received and from which SPI or source port. In some embodiments, ACKs are batched and sent back to the sender on a fixed interval. In some embodiments, ACK packets are sent redundantly using revolving, randomly generated source ports to protect against packet loss.

An ACK packet 601 includes a header 602 which indicates the number of flows contained in the packet. In some embodiments, the header 602 includes a timestamp to indicate when the ACK packet was sent. This timestamp may be used by the sender to adjust an expectation of when ACK packets can be expected and to change the retry time.

For each flow 603 the ACK packet 601 includes the SPI 605 of the flow (originally indicated in the data packets that deliver the data being acknowledged), an ACK block 604, a count of ACK blocks 609, and a sequence number associated with the first bit of the first ACK block for each SPI 607. In some embodiments, each bit of the ACK block 604 represents a packet sequence number (e.g., is indicate acknowledgement, 0s indicate no acknowledgement). In some embodiments, the ACK block 604 is run-length encoded.

Figure 7:
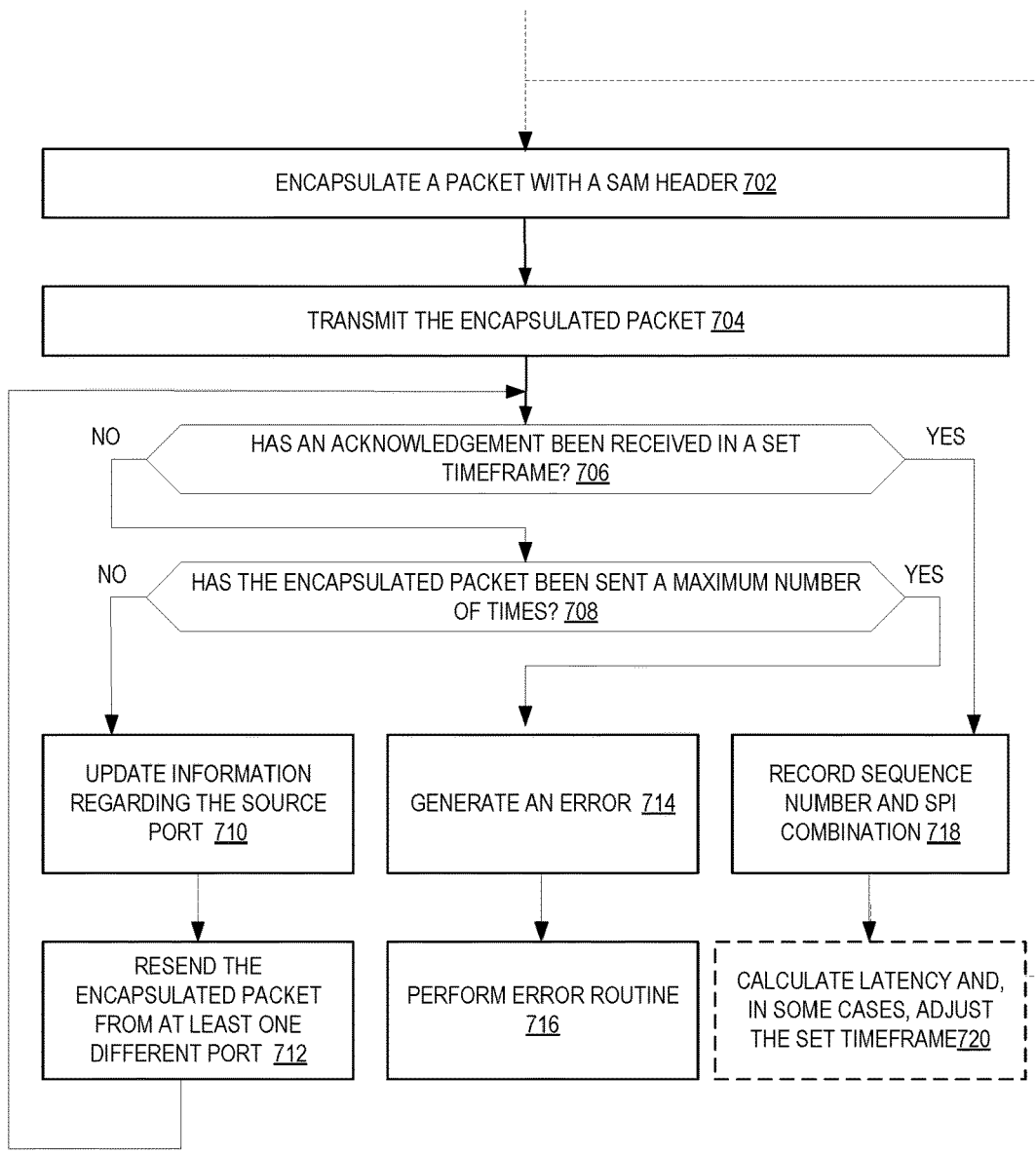
FIG. 7 is a flow diagram illustrating operations of a method for utilizing SAM packets according to some embodiments.

FIG. 7 is a flow diagram illustrating operations of a method for utilizing SAM packets according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by a SAM packet sender of the other figures.

A data packet is encapsulated with a SAM header at 702. In particular, a SAM data packet header is generated and one or more payloads appended to the header.

The encapsulated packet is transmitted to a receiver at 704. The sender is expecting an acknowledgment of the packet from the receiver indicating that the packet was received.

At 706 a determination is made of if an acknowledgement has been received in a set timeframe (the acknowledgment/retry period). For example, has 10 ms passed since the SAM data packet was sent? If yes, then the sequence number of the encapsulated packet is recorded (it does not need to be sent again) along with the SPI (or source port) that was used to send the packet at 718. Additionally, in some embodiments, a roundtrip calculation is made using a timestamp provided by the receiver. The sequence number/SPI combination is important to confirm that each packet was delivered via one of the flows, but may also be used to provide affinity to flows that successfully deliver packets and quickly move away from flows that drop packets.

In some embodiments, a latency for the packet roundtrip is calculated at 720 and the set timeframe is adjusted in some cases to account for the latency. This can be calculated using timestamps of when a packet was sent and when it was acknowledged. In some embodiments, the latency is used to vary a retry count (the number of retries to do in a given period or overall) or a pattern of retries (e.g., retry a first time with 1 packet, retry a second time with 4 packets, etc.)

When the set timeframe passes without an ACK, a determination is made of if the encapsulated packet has been sent a maximum number of times at 708. For example, has the encapsulated packet been retried (with different SPIs or source ports) a set number of times (a retry limit)? In some embodiments, the number of times is user configurable.

When the encapsulated packet has not been retried to the retry limit, in some embodiments, information regarding the source port that was used for the encapsulated packet is updated at 710. Note that this happens in some embodiments right after the time limit expires. Typically, if a sequence number is not acknowledged against a SPI for beyond its maximum expected round-trip time, then the source port that the packet was sent with is retired (such that it will not be used for further packet transmissions until it is necessary to recycle it) and a new source port is used which has the effect of changing the network route for subsequent packets. Changing the source port allows for routing around network problems.

At 712 the encapsulated packet is resent from a different source port at least once. In some embodiments, the packet is sent a single time from multiple, different source ports. As noted above, the resending includes updating the header of the packet. Additionally, in some embodiments, the modified packet is sent multiple times from the same source port and in some embodiments, the modified packet is sent multiple times, but using different source port (e.g., sending the packet a single time from port X and from port Y).

When the encapsulated packet has been retried to the retry limit, an error is generated at 714. In some embodiments, this error is to mark the receiver as inactive. In some embodiments, senders reduce the maximum number of sends per packet for inactive receivers until ACKs resume (and the receiver is active). As such, whether a receiver is active or inactive affects the maximum number of times a packet is retried and/or how metrics are recorded.

At 716 an error routine is performed. For example, a different receiver is chosen.

Figure 8:
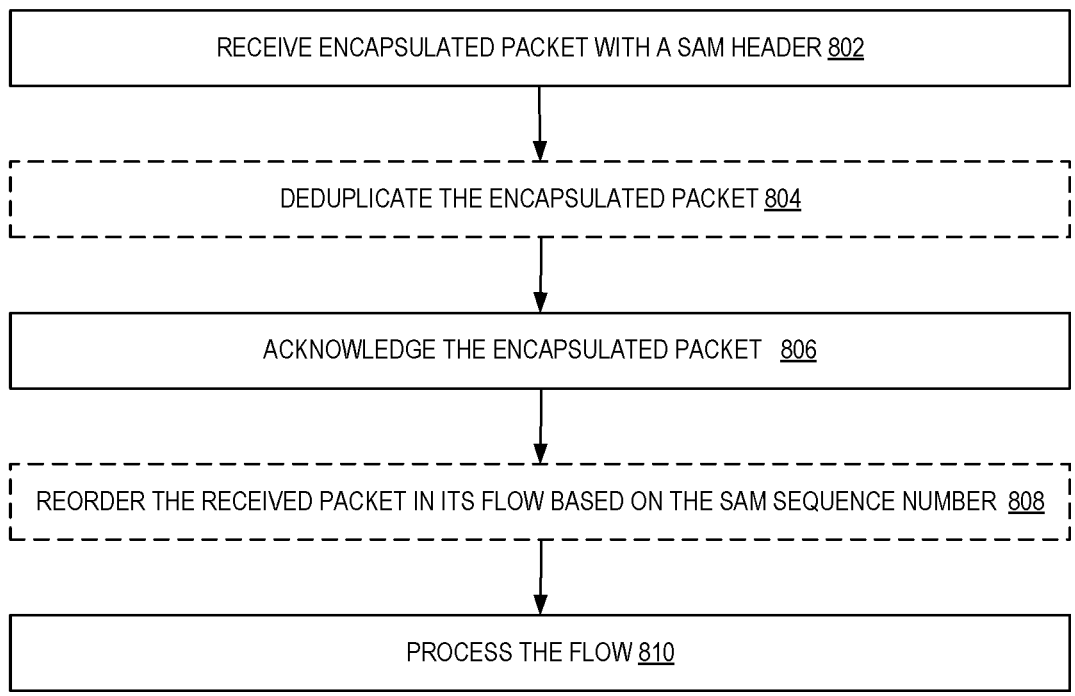
FIG. 8 is a flow diagram illustrating operations of a method for utilizing SAM packets according to some embodiments.

FIG. 8 is a flow diagram illustrating operations of a method for utilizing SAM packets according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by a receiver of the other figures.

At 802 a packet with a SAM header is received.

In some embodiments, the encapsulated packet is deduplicated at 804. In other words, the receiver may not have responded quickly enough with an ACK and another instance of the packet was received. Duplicated packets are determined from the sequence number. In some embodiments, the receiver uses a CRC or other error detection code to determine if the payload of the packet is correct.

The encapsulated packet is ACKed at 806. This includes the generation of an ACK packet. In some embodiments, ACK packets are batched and sent periodically. Further, when CRC, etc. is utilized, packets that have payloads that do not check out are not acknowledged in some embodiments.

The received packet is reordered in its flow based on the SAM sequence number at 808 in some embodiments.

At 810 the flow is processed.

Figure 9:
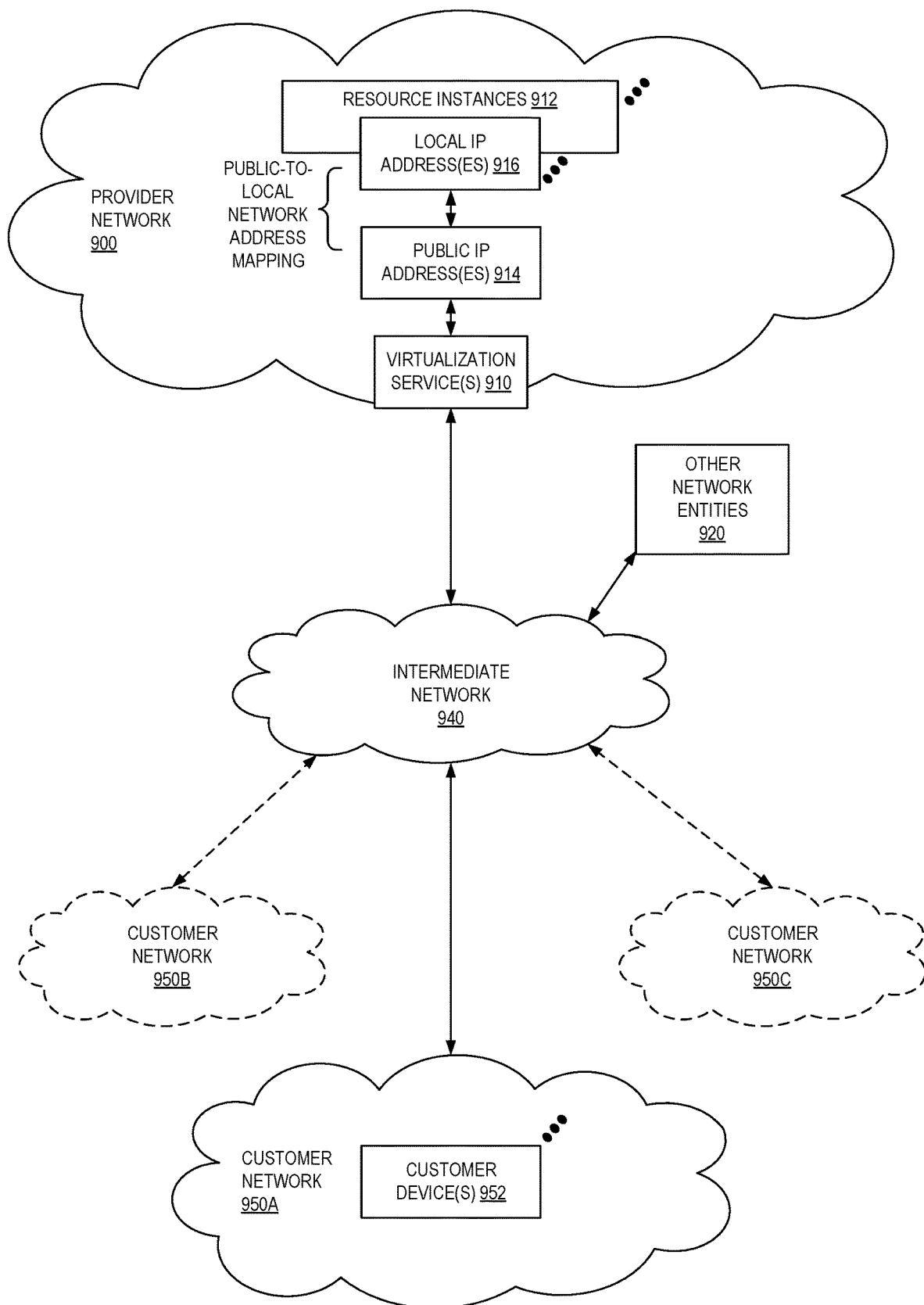
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
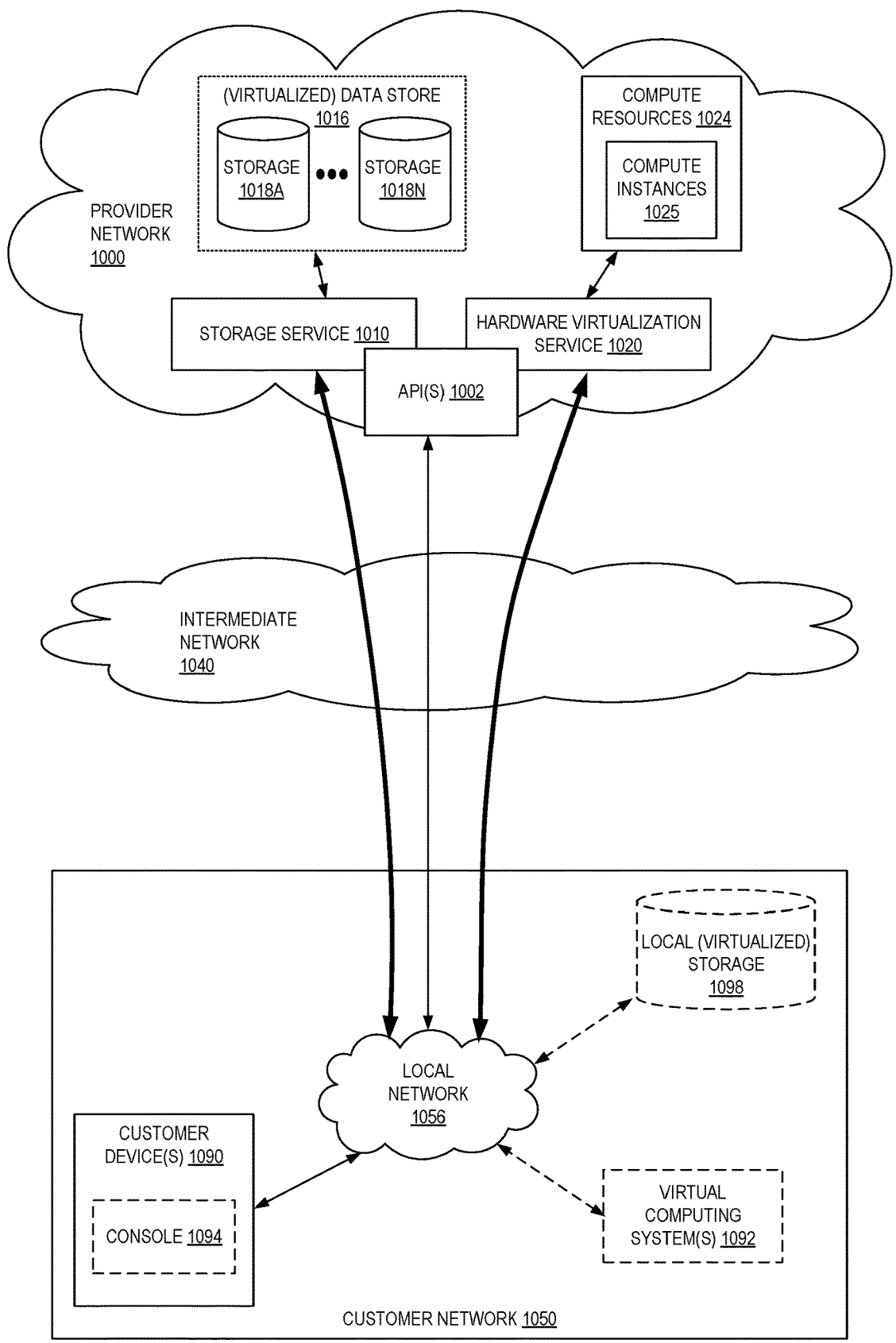
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple compute resources 1024 (e.g., compute instances 1025 such as VMs) to customers. The compute resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the compute resources 1024 to public Internet destinations, and from public Internet sources to the local IP addresses of compute resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
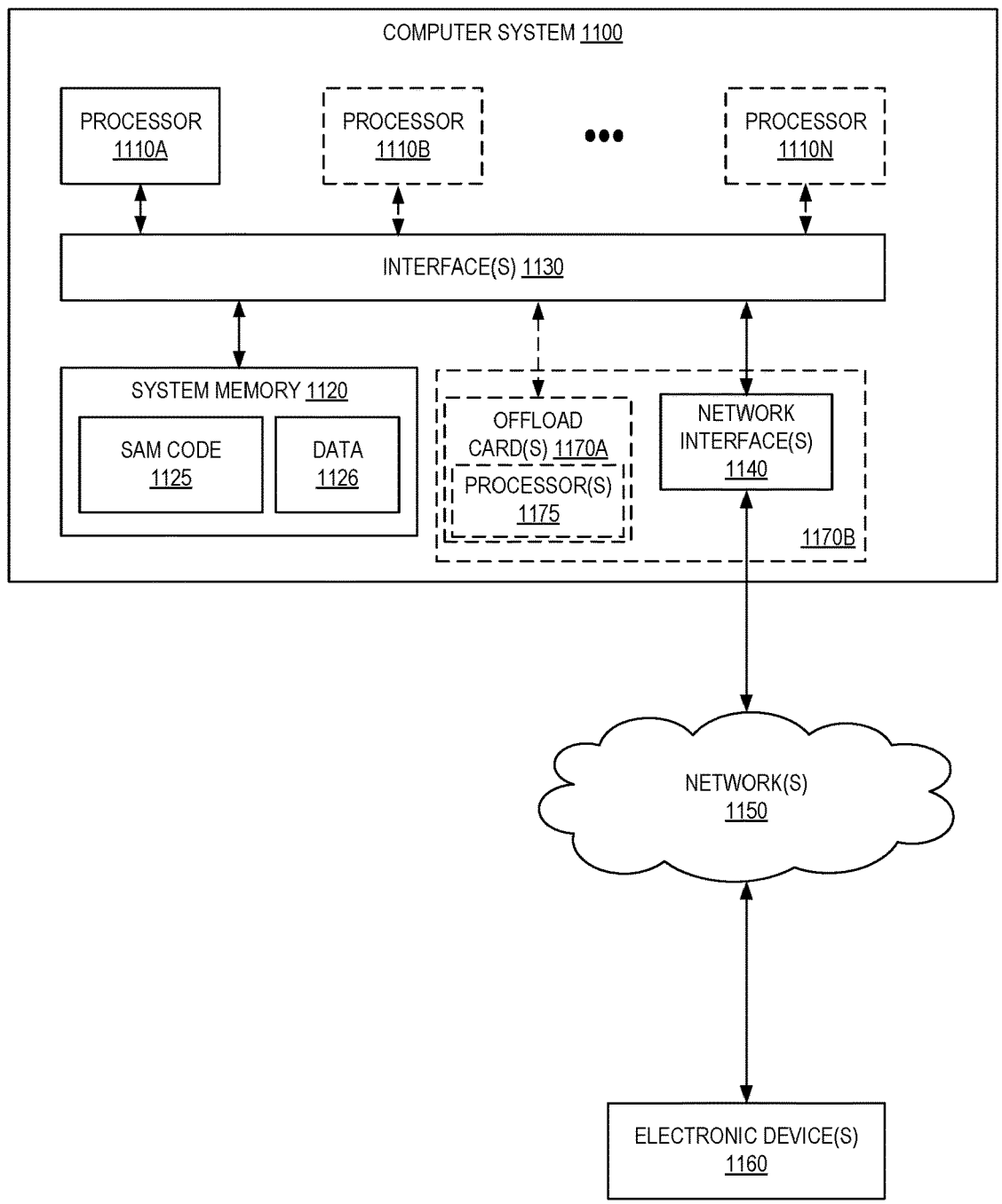
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as SAM code 1125 (e.g., executable to implement, in whole or in part, the SAM protocol) and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170A or 1170B (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute resources such as compute instances, and the one or more offload cards 1170A or 1170B execute a virtualization manager that can manage compute instances that execute on the host electronic device. As an example, in some embodiments the offload card(s) 1170A or 1170B can perform compute instance management operations such as pausing and/or un-pausing compute instances, launching and/or terminating compute instances, performing memory transfer/copying operations, etc. These management operations may, in some embodiments, be performed by the offload card(s) 1170A or 1170B in coordination with a hypervisor (e.g., upon a request from a hypervisor) that is executed by the other processors 1110A-1110N of the computer system 1100. However, in some embodiments the virtualization manager implemented by the offload card(s) 1170A or 1170B can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    generating a first video packet with a first Source port Adaptive Multi-path (SAM) header and a payload, wherein the first SAM header includes an indication of a first source port that the video packet is to be transmitted from;
    transmitting the first video packet from a sender to a receiver over User Datagram Protocol (UDP) using the first source port;
    upon not receiving an acknowledgment from the receiver regarding the video packet within an acknowledgment period, generating a second video packet with a second SAM header and the payload, wherein the second SAM header of the second video packet includes an indication of a second source port, different from the first source port, that the second video packet is to be transmitted from;
    transmitting the second video packet from the sender to the receiver over UDP using the second source port, different from the first source port;
    receiving an acknowledgment regarding one of the first or second video packets from the receiver, wherein the acknowledgment includes an indication of one of the first or second source ports that sent the one of the first or second video packets that was received; and
    recording the indication of the one of the first or second source ports that sent the one of the first or second video packets that was received and an indication of where in a sequence the payload belongs.

2. The computer-implemented method of claim 1, wherein the first and second SAM headers further comprise the indication of where in a sequence the payload belongs, an address of the sender, and an indication of a port for the acknowledgment to be sent to.

3. The computer-implemented method of claim 1, wherein the acknowledgment is a packet that includes a header and a payload that includes an acknowledgment block, where each bit of the acknowledgment block represents a sequence number, a count of acknowledgment blocks in the acknowledgment, and a sequence number associated with the first bit of the first acknowledgment block.

4. A computer-implemented method comprising:
    generating a first packet with a first header and a payload, wherein the first header includes an indication of a first source port that the first packet is to be transmitted from and an indication of where in a sequence the payload belongs;
    transmitting the first packet to a receiver using the first source port;
    upon not receiving an acknowledgment from the receiver regarding the first packet within an acknowledgment period, generating a second packet with a second header and the payload, wherein the second header of the second packet includes an indication of a second source port, different from the first source port, that the second packet is to be transmitted from;
    transmitting the second packet from the sender to the receiver using the second source port, different from the first source port;
    receiving an acknowledgment regarding one of the first or second packets from the receiver, wherein the acknowledgment includes an indication of one of the first or second source ports that sent the one of the first or second packets that was received; and
    recording the indication of the one of the first or second source ports that sent the one of the first or second packets that was received.

5. The computer-implemented method of claim 4, wherein the first header further comprises an address of the sender and an indication of a port for the acknowledgment to be sent to.

6. The computer-implemented method of claim 5, wherein the first header further comprises a time value that indicates how long the receiver should wait for a subsequent packet to be received.

7. The computer-implemented method of claim 5, wherein the first header further comprises an error detection code to be used by the receiver to determine if the payload has been corrupted.

8. The computer-implemented method of claim 5, wherein the indication of the source port is an index value.

9. The computer-implemented method of claim 5, wherein the indication of the source port is an actual source port value.

10. The computer-implemented method of claim 4, wherein a latency of roundtrip times from transmitting a packet from the source to the receiver, and receiving an acknowledgment from the receiver is used to vary one or more of a number of retries to perform upon a failure to receive an acknowledgment and a retry pattern.

11. The computer-implemented method of claim 4, wherein the acknowledgment is a packet that includes a header and a payload that includes an acknowledgment block, where each bit of the acknowledgment block represents a sequence number, a count of acknowledgment blocks in the acknowledgment, and a sequence number associated with the first bit of the first acknowledgment block.

12. The computer-implemented method of claim 4, wherein the acknowledgment includes a plurality of acknowledgment packets.

13. The computer-implemented method of claim 4, further comprising maintaining information regarding successfully received combinations of indications of source port that sent a packet and an indication of where in a sequence the payload of those received packets belongs.

14. The computer-implemented method of claim 13, further comprising assigning an affinity for the successfully received combinations of indications of source port that sent a packet and an indication of where in a sequence the payload of those received packets belongs.

15. A system comprising:
a first electronic device to send at least one data packet to a receiver; and
a second electronic devices to receive the at least one data packet, wherein the first electronic device is to:
generate a first packet with a first header and a payload, wherein the first header includes an indication of a first source port that the first packet is to be transmitted from and an indication of where in a sequence the payload belongs;
transmit the first packet to the second electronic device using the first source port;
upon not receiving an acknowledgment from the receiver regarding the first packet within an acknowledgment period, generate a second packet with a second header and the payload, wherein the second header of the second packet includes an indication of a second source port, different from the first source port, that the second packet is to be transmitted from;
transmit the second packet using the second source port, different from the first source port;
receive an acknowledgment regarding one of the first or second packets, wherein the acknowledgment includes an indication of one of the first or second source ports that sent the one of the first or second packets that was received; and
record the indication of the one of the first or second source ports that sent the one of the first or second packets that was received.

16. The system of claim 15, wherein the first header further comprises an address of the sender and an indication of a port for the acknowledgment to be sent to.

17. The system of claim 15, wherein the first header further comprises a time value that indicates how long the receiver should wait for a subsequent packet to be received.

18. The system of claim 15, wherein the first header further comprises an error detection code to be used by the receiver to determine if the payload has been corrupted.

19. The system of claim 15, wherein the indication of the source port is an index value.

20. The system of claim 15, wherein the indication of the source port is an actual source port value.

* * * * *